(12) United States Patent
Ho

(10) Patent No.: US 6,422,050 B1
(45) Date of Patent: Jul. 23, 2002

(54) BURGLARPROOF LOCKING DEVICE FOR HANDLE AND AIRBAG OF VEHICLE

(76) Inventor: Hui I Ho, No. 29, Alley 7, Lane 428, Chung Cheng N. Road, Sanchung, Taipei Hsien (TW)

( * ) Notice: Subject to any disclaimer, the term of this patent is extended or adjusted under 35 U.S.C. 154(b) by 0 days.

(21) Appl. No.: 09/501,991

(22) Filed: Feb. 11, 2000

(51) Int. Cl.[7] .................................................. B62H 5/14
(52) U.S. Cl. .......................................... 70/209; 70/237
(58) Field of Search .......................... 70/209, 226, 238, 70/237

(56) References Cited

U.S. PATENT DOCUMENTS 5,107,692 A * 4/1992 Chen ........................... 70/209
6,189,647 B1 * 2/2001 Horn, III et al. ............. 70/209

* cited by examiner

Primary Examiner—William A. Cuchlinski, Jr.
Assistant Examiner—Edward Pipala
(74) Attorney, Agent, or Firm—Rosenberg, Klein & Lee

(57) ABSTRACT

A burglarproof locking device for handle and airbag of vehicle comprises a first panel and a second panel. The first panel is of plate shape and has a hollow chamber therein. The first panel has a first L-shape hook and a key unit. The key unit is operated to control movement of a sliding block in retractable manner. The second panel is of plate shape and has a plurality of clamping parts corresponding to the sliding block. The second panel has a second L-shape hook. One end of the second panel is inserted into the hollow chamber of the first panel in a telescopic manner. The key unit is operated to control the sliding block to lock into one of the clamping parts.

7 Claims, 10 Drawing Sheets

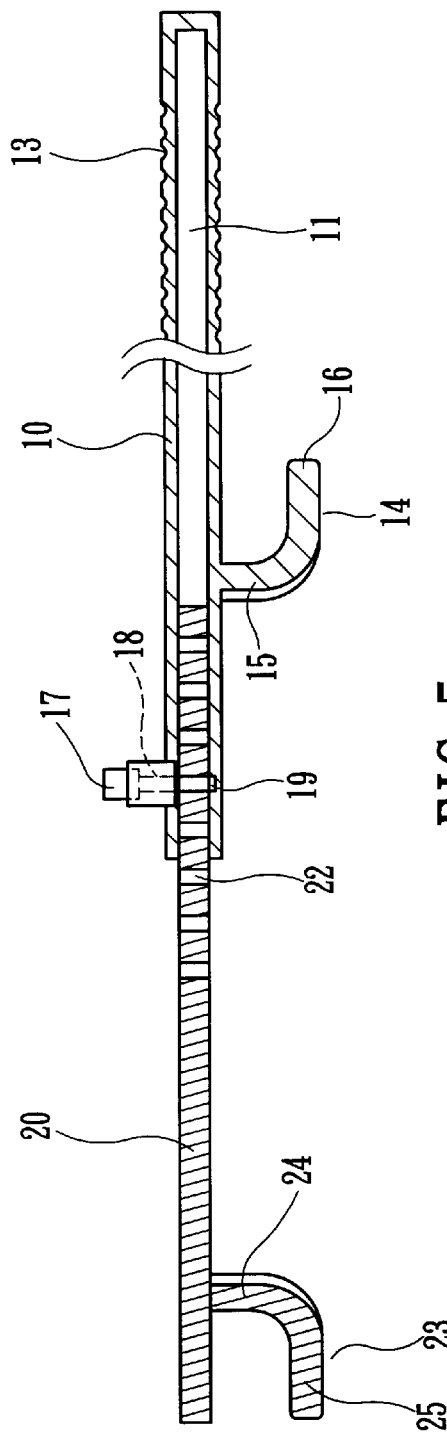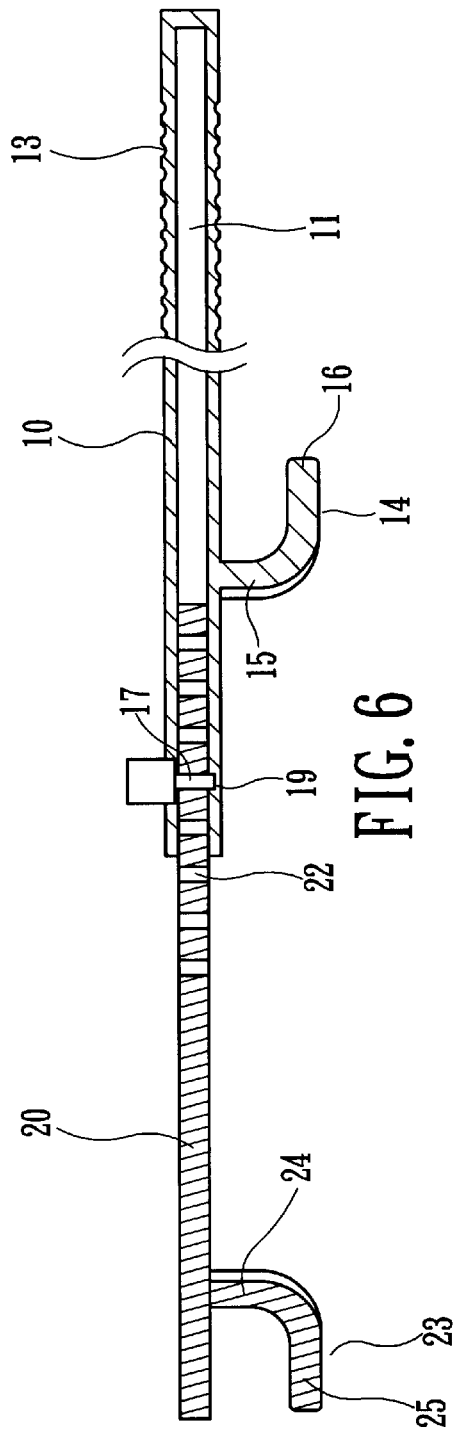

BURGLARPROOF LOCKING DEVICE FOR HANDLE AND AIRBAG OF VEHICLE

FIELD OF THE INVENTION

The present invention relates to a locking device for vehicle, especially to a burglarproof locking device for handle and airbag of vehicle.

BACKGROUND OF THE INVENTION

FIG. 1A shows the perspective view of a conventional burglarproof locking device for handle of vehicle. The burglarproof locking device comprises a long sleeve 10a, a short sleeve 11a and a connection tube 12a therein. One end of the tube 12a is inserted into a hollow end of the long sleeve 10a. The long sleeve 10a has a U-shape hook 13a and an H-shape hook 14a, and the short sleeve 11a has an H-shape hook 15a. The H-shape hook 14a and the H-shape hook 15a are arranged at the same side and aligned in a line. A key unit 16 is arranged beside the U-shape hook 13a and controls the movement of a sliding block (not shown) engaged within the connection tube 12a such that the position of the connection tube 12a can be adjusted and the short sleeve 11a can be rotated to cover the handle, clutch and brake pedal of the vehicle.

However, the airbag of the vehicle is generally expensive equipment and can not be locked by the conventional burglarproof locking device for handle of vehicle. The long sleeve 10a and the short sleeve 11a of the conventional burglarproof locking device are slim tubular shape, therefore, the conventional burglarproof locking device can not provide sufficient protection for the airbag. The burglar can easily take away the airbag of the vehicle even thought the conventional burglarproof locking device is locked upon the handle.

Moreover, the U-shape hook and the H-shape hook of the conventional burglarproof locking device are made of cylindrical or sheet-like material. The U-shape hook and the H-shape hook can not provide sufficient clamping force for the handle even ought the conventional burglarproof locking device is locked on the handle.

It is an object of the present invention to provide a burglarproof locking device for handle and airbag of vehicle, which has larger covering area such that the burglarproof locking device can also cover the airbag when being mounted on the handle.

It is another object of the present invention to provide a burglarproof locking device for handle and airbag of vehicle, which has L-shape hook with arc shape surface corresponding to the rounded handle, whereby the handle can be stably clamped by the inventive burglarproof locking device.

BRIEF DESCRIPTION DRAWING:

FIG. 5 is the longitudinal sectional view of the invention;

FIG. 6 is the longitudinal sectional view of the invention in a locked state;

DETAILED DESCRIPTION OF THE PREFERRED EMBODIMENT

Figure 1A:
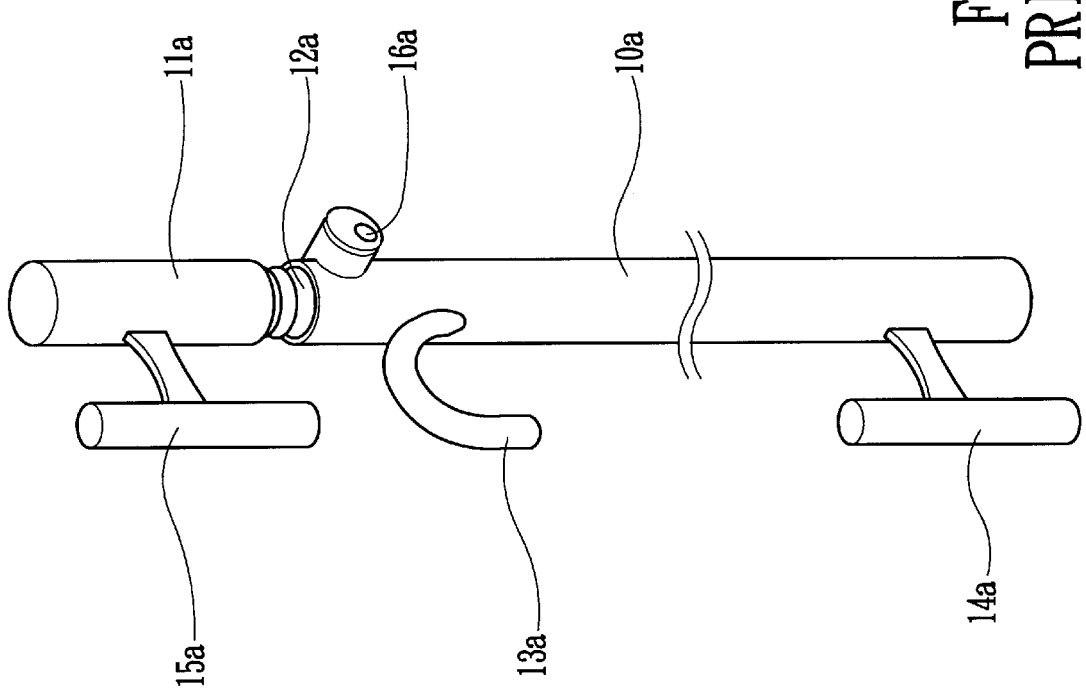
FIG. 1A is a perspective view of prior art burglarproof locking device.
Figure 1B:
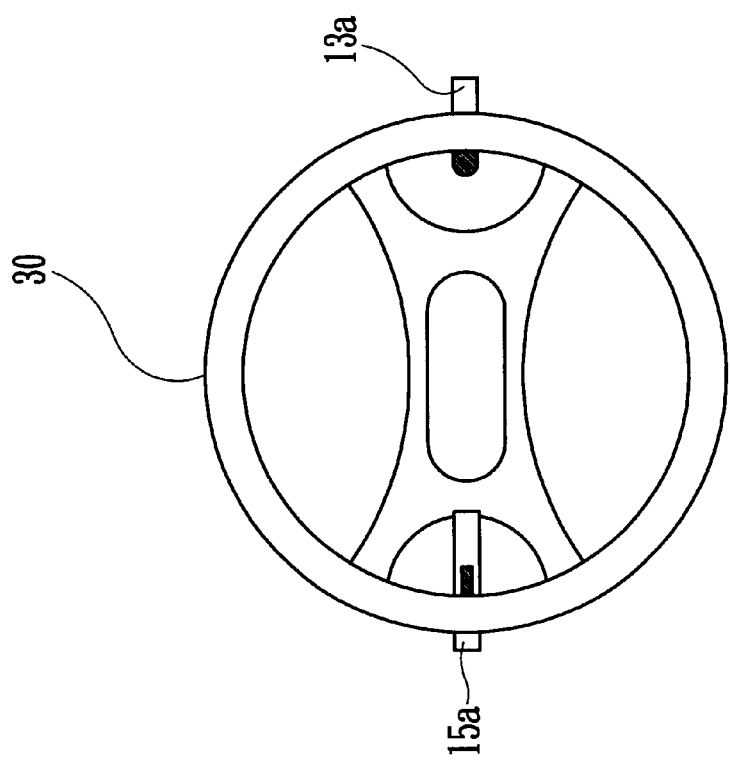
FIG. 1B is a sectional view of prior art burglarproof locking device locked on a handle.
Figure 2:
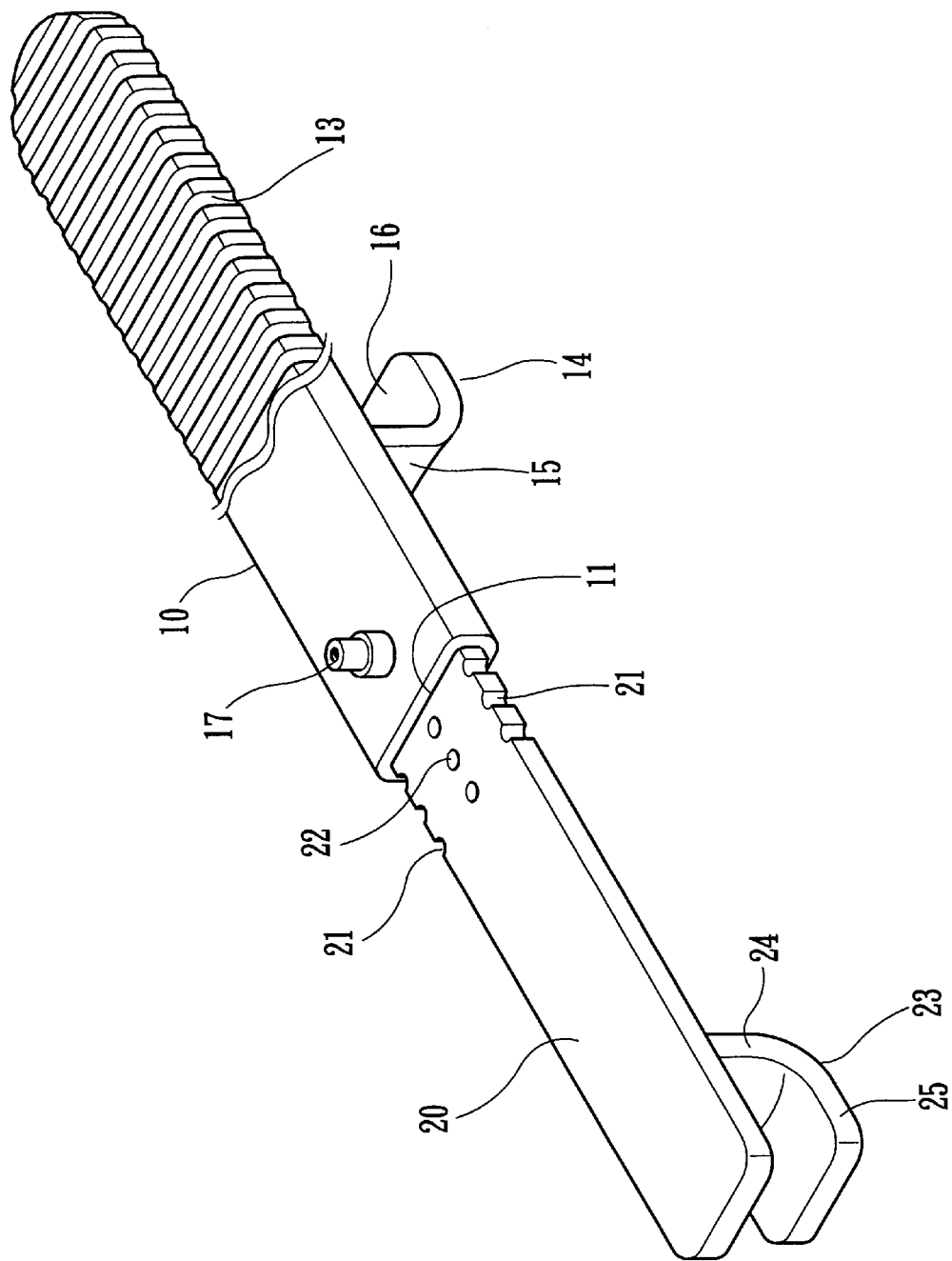
FIG. 2 is the perspective view of the invention.
Figure 3:
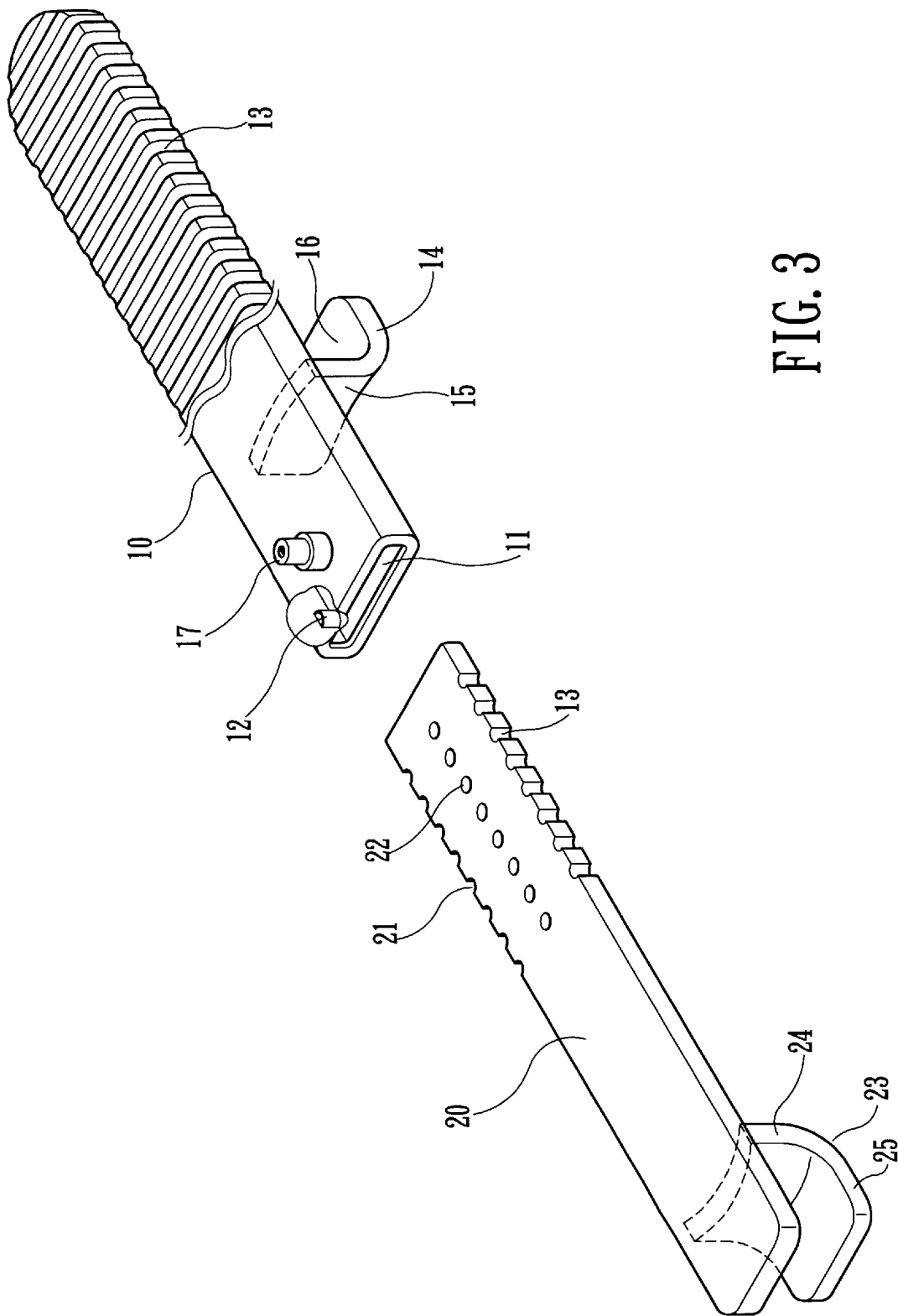
FIG. 3 is the exploded view of the invention.
Figure 4:
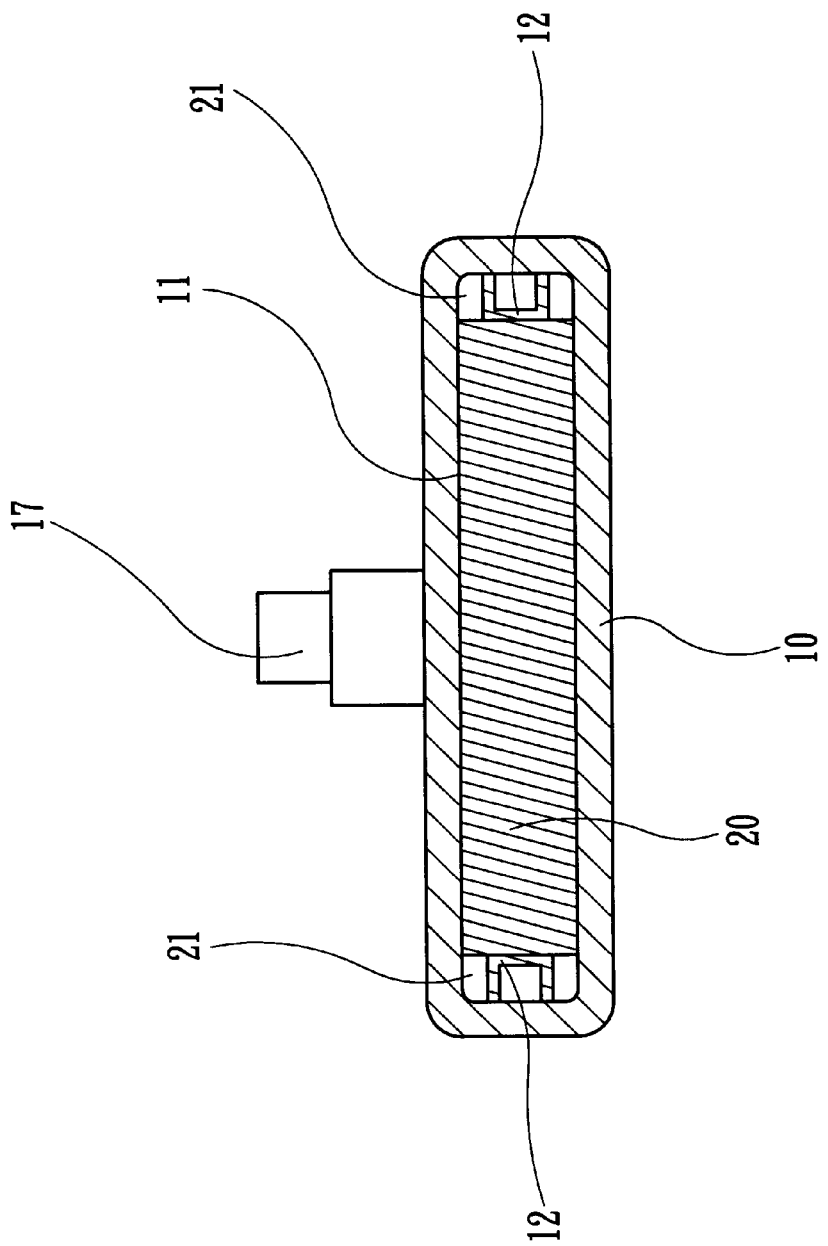
FIG. 4 is the transverse sectional view of the invention.

As shown in FIGS. 2 to 4, the burglarproof locking device of the present invention comprises a first panel 10 and a second panel 20. The first panel 10 is of plate shape and has a hollow chamber 11 therein. The hollow chamber 11 has an opening on one side thereof and has locking body 12 on both inner sides thereof. A skidproof part 13 is arranged at a distal end of the first panel 10 and encloses the distal end. The skidproof part 13 can be made of fluorescent material to facilitate nighttime use. The first panel 10 further comprises an L-shape hook 14 of plate shape. The L-shape hook 14 comprises a first plate 15 and a second plate 16. The first plate 15 is of arc shape corresponding to the rounded shape of handle and has one end connected to the second plate 16. The second plate 16 is parallel to the first panel 10 and has a predetermined separation therebetween. The first panel 10 further comprises a key unit 17 controlling the sliding movement of a sliding block 18 in a retractable manner. The hollow chamber 11 has a clamping groove 19 on the inner wall thereof and corresponding to the sliding block 18.

The second panel 20 has a predetermined length and can be inserted into the hollow chamber of the first panel 10 through the opening. The second panel 20 has a plurality of locking grooves 21 on two lateral sides thereof and near the first panel 10. The second panel 20 further comprises a plurality of clamping holes 22 arranged in a row along the lengthwise direction of the second panel 20. The plurality of clamping holes 22 and the sliding block 18 and the clamping groove 19 form a clamping means of the e burglarproof locking device of the present invention. The second panel 20 further comprises a second L-shape hook 23 of plate shape and opposite to the locking grooves 21. The second L-shape hook 23 comprises a third plate 24 and a fourth plate 25. The third plate 24 is of arc shape corresponding to the rounded shape of handle and has one end connected to the second panel 20 and another end connected to the fourth plate 25. The fourth plate 25 is parallel to the second panel 20 and has a predetermined separation therebetween. The L-shape hooks 14 and 23 are arranged at the same side and aligned along a line. One end of the second panel 20 is inserted into the hollow chamber of the first panel 10 through the opening. The position of the second panel 20 is controlled by the engagement of the locking body 12 and corresponding locking grooves 21. The second panel 20 is telescopically inserted into the first panel 10 and the insertion depth has pitch controlled by the engagement of the locking body 12 and corresponding locking grooves 21. The key unit 17 can be operated to move the sliding block 18 to clamp into one of the clamping holes 22 and the clamping groove 19, thus clamping the second panel 20, as shown in FIG. 6. The sliding block 18 can reach the bottom plate of the first panel 10, thus providing stable clamping force.

Figure 7:
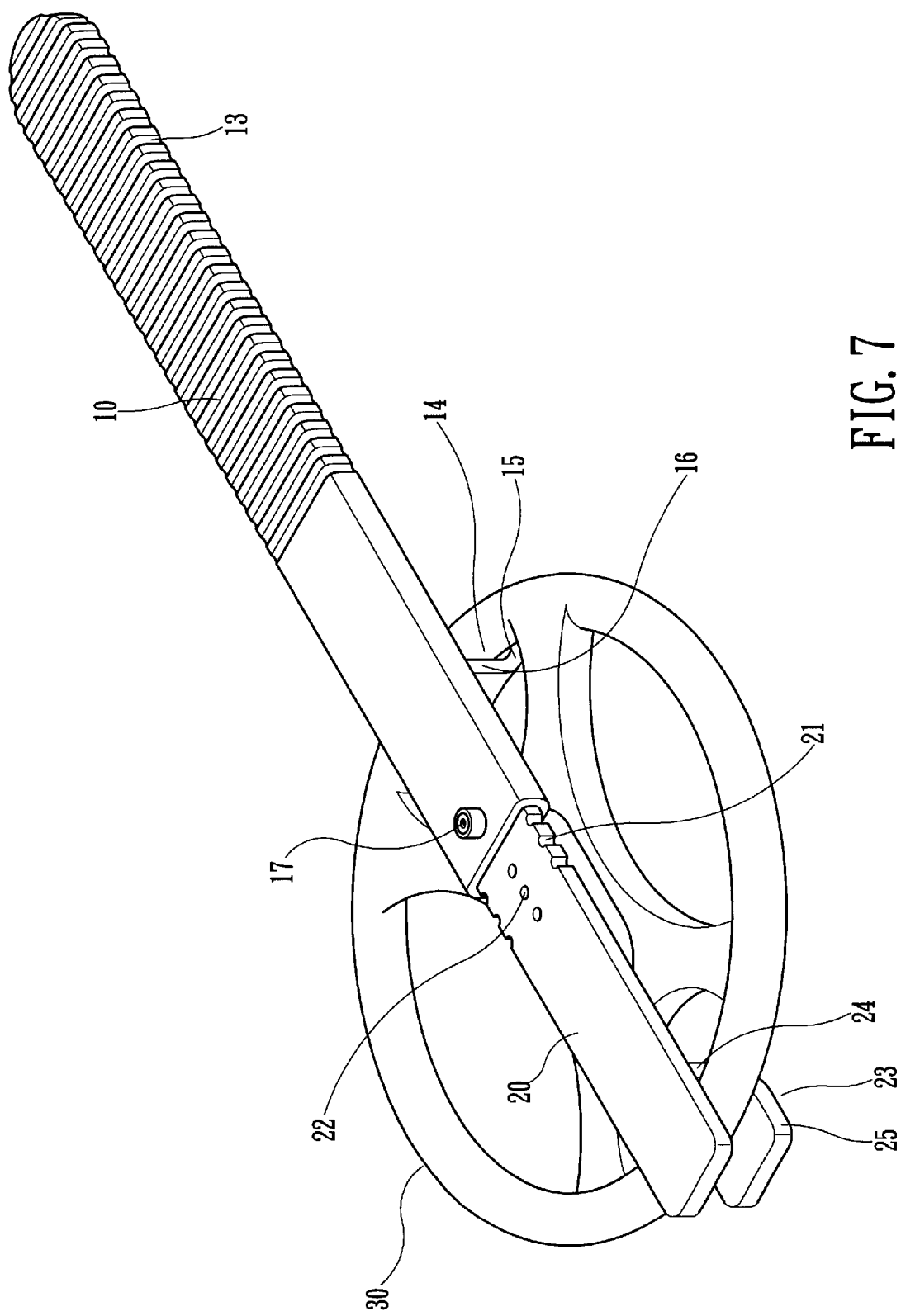
FIG. 7 shows the application of the invention.

As shown in FIG. 7, the L-shape hooks 14 and 23 are arrange to lock two inner sides of the handle 30. The key unit 17 is operated to move the sliding block 18 to clamp into one of the clamping holes 22 and the clamping groove 19, thus clamping the second panel 20 and the handle 30.

Figure 9:
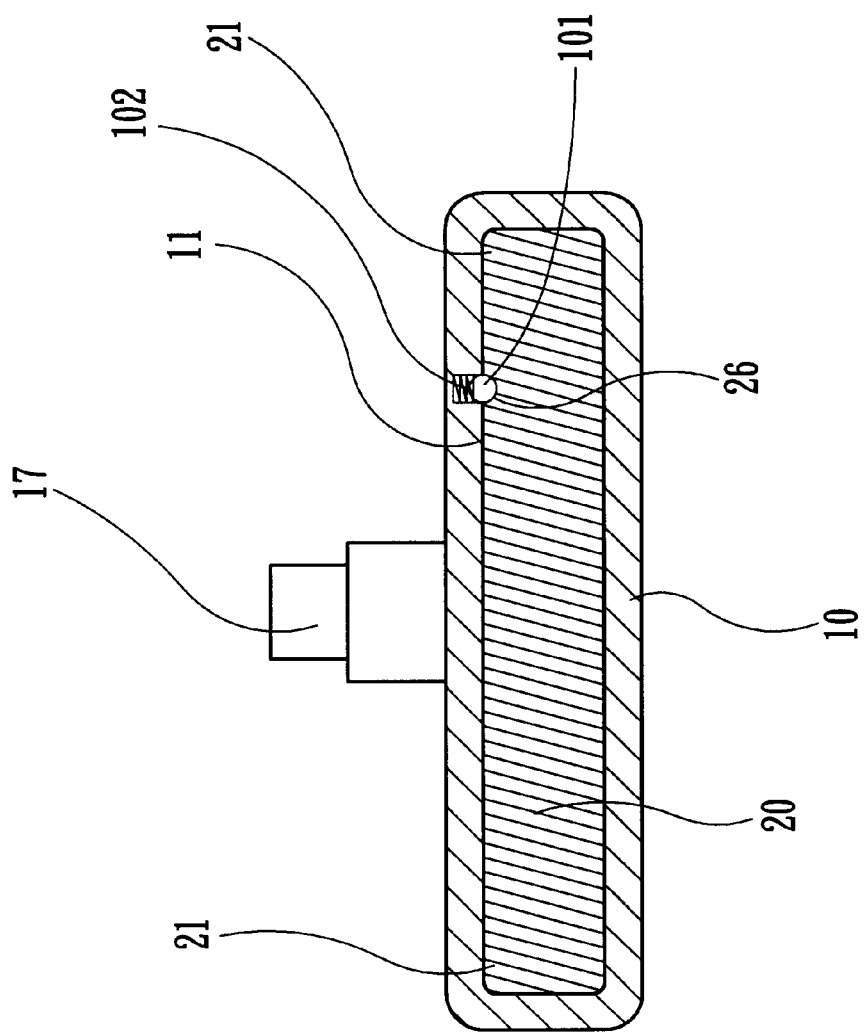
FIG. 9 is the transverse sectional view of another preferred embodiment of the invention.

As shown in FIG. 9, the first panel 10 further comprises a rolling ball 101 and a spring 102 to propelling the rolling ball 101 out of the inner wall of the hollow chamber 11. The second panel 20 has a plurality of clamping dents 26 arranged in lengthwise direction such that rolling ball 101 is selectively inserted into one of the clamping dents 26 to provide clamping effect.

Figure 10:
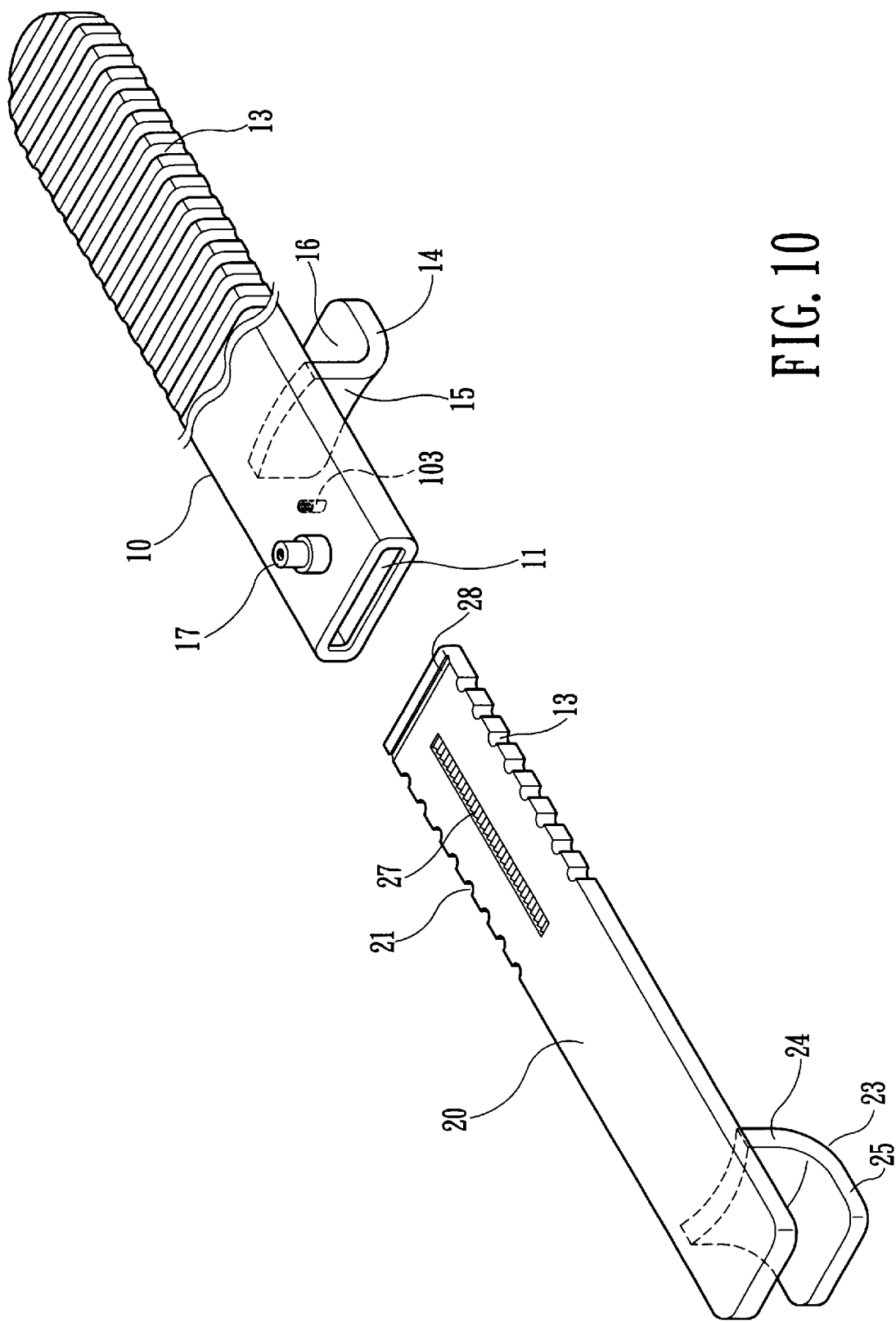
FIG. 10 is the exploded view of another preferred embodiment of the invention.

As shown in FIG. 10, The second panel 20 is provided with a plurality of clamping teeth 27 to replace the role of the clamping holes 22. The key unit 17 is operated to move the sliding block 18 to clamp into one of the clamping teeth 27, thus clamping the second panel 20. The second panel 20 is provided with a detach-proof groove 28 on rear end thereof and the hollow chamber 11 of the first panel 10 has an elastic pin 103 extended from the front inner surface. The elastic pin 103 is engaged with the detach-proof groove 28 when the second panel 20 is pulled out too much and probably detached from the hollow chamber 11 of the first panel 10.

To sum up, the burglarproof locking device for handle and airbag of vehicle according to the present invention has following advantages.

1. The first panel 10 and second panel 20 are of plate to provide better covering effect for the handle and airbag. The airbag has better protection from burglar when the first panel 10 and second panel 20 are locked upon the handle 30.

Figure 8:
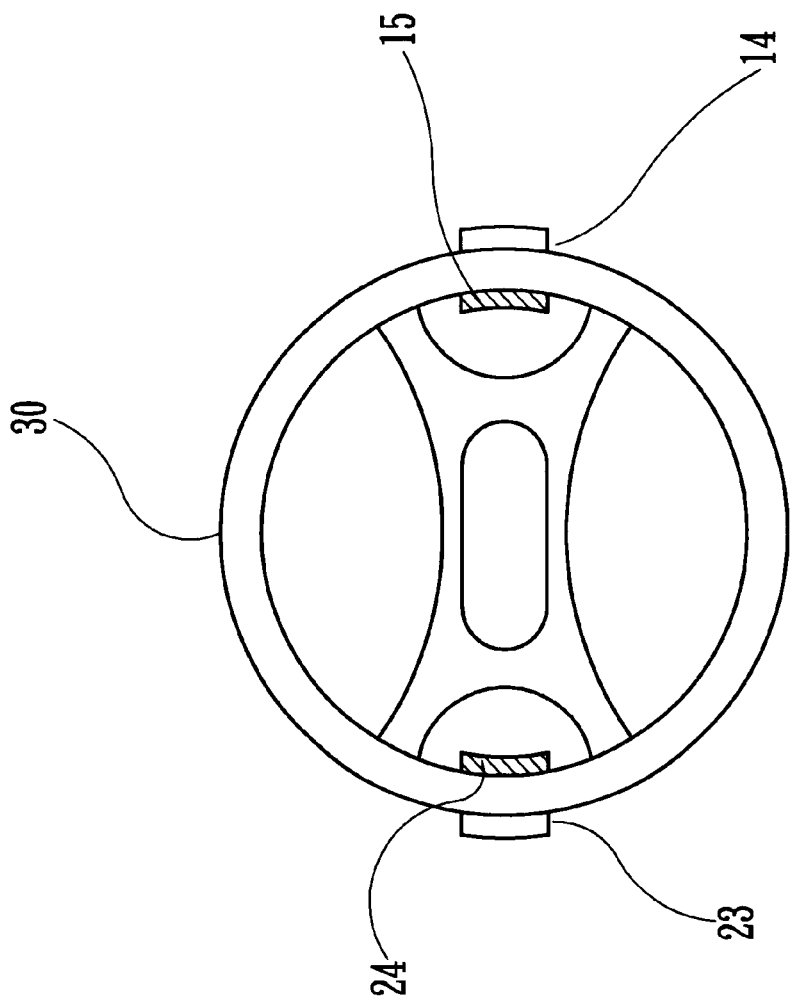
FIG. 8 is a sectional view of the inventive burglarproof locking device locked on a handle.

2. The first L-shape hook 14 and the second L-shape hook 23 are made of plates 15, 16, 24, and 25, thus having better covering effect for the handle. The first plate 15 and the third plate 24 have arc shape corresponding to the rounded surface of handle 30 a shown in FIG. 8, the first plate 15 and the third plate 24 have larger contact area with the handle 30 and provide better clamping force.

3. The key unit 17 can be operated to move the sliding block 18 to clamp into one of the clamping holes 22 and the clamping groove 19, thus clamping the second panel 20, as shown in FIG. 6. The sliding block 18 can reach the bottom plate of the first panel 10, thus providing stable clamping force.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A burglarproof locking device for a handle and an airbag of a vehicle, comprising:

an elongate first panel having a hollow chamber therein; said first panel having a first L-shape hook and a key unit; said key unit operated to control movement of a sliding block in retractable manner;

a second panel of plate shape and having a plurality of clamping parts corresponding to said sliding block, and a second L-shape hook; one end of said second panel inserted into said hollow chamber of said first panel in a telescopic manner; said key unit operated to control said sliding block to lock into one of said clamping parts.

2. The burglarproof locking device as in claim 1, wherein said hollow chamber has a plurality of locking bodies on two inner sides thereof, said second panel has a plurality of locking grooves on two sides thereof and near said first panel; said locking groove being selectively engaged within said locking bodies.

3. The burglarproof locking device as in claim 1, wherein said first panel has a skidproof part on one end thereof and made of fluorescent material.

4. The burglarproof locking device as in claim 1, wherein said hollow chamber of said first panel has a clamping groove on the inner wall thereof and said sliding block can be engaged therein.

5. The burglarproof locking device as in claim 1, wherein said first L-shape hook and said second L-shape hook are of plate shape.

6. The burglarproof locking device as in claim 1, wherein said first panel has a rolling ball and a spring to propel said rolling ball out of an inner wall of said hollow chamber; the second panel has a plurality of clamping dents arranged in lengthwise direction such that said rolling ball is selectively inserted into one of said clamping dents to provide clamping effect.

7. The burglarproof locking device as in claim 1, wherein said clamping parts are clamping holes or clamping teeth.

* * * * *